US008722767B2

(12) United States Patent
Mao

(10) Patent No.: US 8,722,767 B2
(45) Date of Patent: May 13, 2014

(54) ANTICORROSION COATING COMPOSITION, AN ANTICORROSION FILM AND AN ANTICORROSIVE ARTICLE

(75) Inventor: Xuepu Mao, Shenzhen (CN)

(73) Assignee: E I du Pont de Nemours and Company, Wilmington, DE (US)

( * ) Notice: Subject to any disclaimer, the term of this patent is extended or adjusted under 35 U.S.C. 154(b) by 175 days.

(21) Appl. No.: 13/498,916

(22) PCT Filed: Sep. 30, 2010

(86) PCT No.: PCT/US2010/050884
§ 371 (c)(1),
(2), (4) Date: Apr. 13, 2012

(87) PCT Pub. No.: WO2011/041527
PCT Pub. Date: Apr. 7, 2011

(65) Prior Publication Data
US 2012/0270968 A1  Oct. 25, 2012

(30) Foreign Application Priority Data
Sep. 30, 2009  (CN) .......................... 2009 1 0204980

(51) Int. Cl.
*C08K 3/22* (2006.01)
*C08K 5/3417* (2006.01)
*C09D 5/08* (2006.01)
*C09D 127/18* (2006.01)
*C09D 163/02* (2006.01)
*C09D 179/08* (2006.01)
*C09D 181/04* (2006.01)
*C09D 181/06* (2006.01)
*B32B 27/38* (2006.01)

(52) U.S. Cl.
USPC ........... 523/435; 428/413; 525/108; 525/111; 525/121

(58) Field of Classification Search
None
See application file for complete search history.

(56) References Cited

U.S. PATENT DOCUMENTS

| | | | |
|---|---|---|---|
| 3,661,831 A * | 5/1972 | Fang | 523/454 |
| 4,139,576 A | 2/1979 | Yoshimura et al. | |
| 4,383,075 A | 5/1983 | Abel | |
| 5,130,201 A * | 7/1992 | Yoshimura et al. | 428/416 |
| 5,455,089 A * | 10/1995 | Mochida et al. | 428/35.8 |
| 7,026,036 B2 * | 4/2006 | Leech et al. | 428/142 |
| 7,034,076 B2 | 4/2006 | Torii et al. | |
| 2006/0017281 A1 * | 1/2006 | McKeen | 285/45 |
| 2006/0127622 A1 * | 6/2006 | Mohan et al. | 428/36.91 |
| 2007/0219333 A1 * | 9/2007 | Shimono et al. | 526/249 |
| 2012/0237778 A1 * | 9/2012 | Mao et al. | 428/422 |

FOREIGN PATENT DOCUMENTS

| | | | |
|---|---|---|---|
| DE | 10252142 A1 * | 5/2004 | |
| EP | 2011838 A1 | 1/2009 | |
| JP | 2008144185 A | 6/2008 | |
| WO | 2005010107 A1 | 2/2005 | |
| WO | 2007109817 A2 | 10/2007 | |

* cited by examiner

*Primary Examiner* — Robert Sellers
(74) *Attorney, Agent, or Firm* — Andrew G. Bunn

(57) ABSTRACT

A coating composition, an anticorrosion film formed by the composition, as well as an anticorrosive article, are disclosed. The coating composition comprises 1-35% by weight of one or more fluoropolymer; 1-70% by weight of one or more epoxy resin; 5-70% by weight of one or more polyamideimide; 0-40% by weight an auxiliary binder consisting of one or more of polyethersulfone, polyphenylene sulfide, polyamide, polyimide, polyether ether ketone, polyetherimide, polyurethane, alkyd resin, polyester, or acrylic polymers; and, based on 100 parts by weight of the above components, 100-400 parts by weight of solvent.

16 Claims, No Drawings

US 8,722,767 B2

ANTICORROSION COATING COMPOSITION, AN ANTICORROSION FILM AND AN ANTICORROSIVE ARTICLE

FIELD OF THE INVENTION

This invention relates to an anticorrosion coating composition, an anticorrosion film formed by the composition and anticorrosive articles protected by such anticorrosion film. More specifically, this invention provides fluoropolymer coating compositions for fasteners, such as nuts and bolts, where the coating provides improved corrosion resistance compared to conventional coatings, while maintaining both good coating-substrate adhesion and the ability to release (coating-coating release) so that the nuts and bolts can be unscrewed, even after exposure to salt water environments.

BACKGROUND OF THE INVENTION

Many infrastructures need anticorrosive treatment. For instance, as some steel-structured facilities such as offshore oil field drilling facilities and offshore floating docks have long-term exposure to seawater, the corrosion of such facilities are accelerated by saline matter in seawater and sun exposure. In order to extend the facilities' service life as well as to ensure security and safety, such facilities need anticorrosive treatment for their steel structures.

Currently, polytetrafluoroethylene-based (PTEF-based) coatings represent the most common anticorrosive coatings. The anticorrosive coating protects metal structures and facilities against corrosion, by seawater in most cases. However, the polytetrafluoro-ethylene resin based coating fails to meet some demanding requirements in terms of high-performance anti-corrosion and high-performance anti-erosion. The most commonly used method to measure the corrosion resistance of a coated metal substrate is the salt spray resistance test. For instance, superior anti-corrosive coatings on high-standard steel structures (such as carbon steel parts) will protect the metal from rusting for a longer period of time when undergoing the salt spray test, which equates to an extended service life and reduced maintenance costs for structures exposed to saline matter in seawater when in use. Current polytetrafluoroethylene based coatings prepared on ordinary carbon steel structures without any surface treatment can only undergo approximately 350 hrs salt spray test when the thickness of the film is 25±5 micrometer in accordance with the ASTM B-117 testing condition. Thus, it is quite difficult for such coatings to meet the increasing requirements for anticorrosion performance.

Furthermore, some bolts and nuts not only require high-performance anticorrosion, but also require the anti-corrosive coatings prepared on the bolts and nuts to have perfect anti-erosion and other mechanical performances so as to avoid coating erosion/flaking during fastening and loosing bolt-and-nut structures, insomuch that the anti-corrosion performance will not be impacted. In other words, anticorrosive coatings for steel-structures should protect the structures both from corrosion and from erosion/flaking for a longer period of time.

U.S. Pat. No. 4,139,576 (to Yoshimura, et al.) discloses a coating composition which includes a polyarylene sulfide resin, at least one imido-containing resin, and a fluorocarbon polymer. However, to date, such systems are still deficient with respect to corrosion resistance and adhesion to the substrate after exposure to seawater. Therefore, it is still necessary to develop a better anti-corrosive coating composition which not only has much better anti-corrosion performance but also has better anti-erosion performance. Furthermore, in many applications it is important that the anti-corrosion coating is effective even as a single coat application.

SUMMARY OF THE INVENTION

One aspect of the invention disclosed herein provides coating compositions which combine good anti-corrosion performance with good anti-wear performance.

Another aspect of the invention disclosed herein provides anticorrosion films made from the aforementioned coating compositions.

Another aspect of the invention disclosed herein provides anticorrosive articles protected by the aforementioned anticorrosion films.

In an embodiment, the invention provides an anticorrosion film comprising, as a weight percent of solids based on the total weight of solids: (a) 1-35% by weight of one or more fluoropolymer; (b) 1-70% by weight of one or more epoxy resin; (c) 5-70% by weight of one or more polyamideimide.

In an embodiment, the anticorrosion film further comprises, as component (d), 1-40% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

For each embodiment that describes an anticorrosion film, there exists an embodiment wherein the anticorrosion film is a single layer coating.

In another embodiment, the invention provides an anticorrosive article comprising:
(a) a substrate; and (b) an anticorrosion film coated on the substrate, the anticorrosion film comprising: (a) 1-35% by weight of one or more fluoropolymers; (b) 1-70% by weight of one or more epoxy resins; (c) 5-70% by weight one or more polyamideimide; and, optionally, (d) 0-40% by weight, such as, for example 1-40% by weight, of an auxiliary binder consisting of one or more of polyethersulfone, polyphenylene sulfide, polyamide, polyimide, polyether ether ketone, polyetherimide, polyurethane, alkyd resin, polyester, or acrylic polymers.

In another embodiment, the invention provides a liquid coating composition comprising: (a) 1-35% by weight of one or more fluoropolymer; (b) 1-70% by weight of one or more epoxy resin; (c) 5-70% by weight of one or more polyamideimide; optionally, (d) 0-40% by weight, such as, for example 1-40% by weight, of an auxiliary binder consisting of one or more of polyethersulfone, polyphenylene sulfide, polyamide, polyimide, polyether ether ketone, polyetherimide, polyurethane, alkyd resin, polyester, or acrylic polymers; and a solubly or dispersibly effective amount of solvent.

Further, the invention provides a method of forming an anticorrosion film on the substrate, the method consisting of the following steps:
i) coating the substrate with a liquid coating composition comprising:
   (a) 1-35% by weight of one or more fluoropolymer;
   (b) 1-70% by weight of one or more epoxy resin;
   (c) 5-70% by weight of one or more polyamideimide;
   (d) 0-40% by weight, such as, for example 1-40% by weight, of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
   (e) an effective amount of solvent; and ii) heating the coated substrate to form the anticorrosion film.

In an embodiment, the heating step is performed at 180-240° C.

DETAILED DESCRIPTION

Where a range of numerical values is recited herein, unless otherwise stated, the range is intended to include the endpoints thereof, and all integers and fractions within the range. It is not intended that the scope of the invention be limited to the specific values recited when defining a range. Moreover, all ranges set forth herein are intended to include not only the particular ranges specifically described, but also any combination of values therein, including the minimum and maximum values recited.

By "fluoropolymer" it is meant a polymer or copolymer with a backbone comprising repeat units of at least one polymerized monomer comprising at least one fluorine atom. The term "highly fluorinated" means that at least 90% of the total number of halogen and hydrogen atoms attached to the polymer backbone and side chains are fluorine atoms. When the polymer is "perfluorinated", this means 100% of the total number of halogen and hydrogen atoms attached to the backbone and side chains are fluorine atoms.

Herein, the term "polyamideimide" (or "PAI") also includes polyamic acid and salts of polyamic acid from which polyamideimide may be derived.

Herein, except when referring to quantities of solvent, "weight %" or "% by weight" means the weight percent of non-volatile component expressed as a percentage of the total weight of non-volatile components in the composition. When referring to quantities of solvent, "weight %" or "% by weight" means the weight percent of solvent expressed as a percentage of the total weight of non-volatile components in the composition.

Herein, unless otherwise stated, the term "(co)polymer" includes homopolymers and copolymers.

Herein, unless otherwise stated, the term "(meth)acrylates" includes acrylates and methacrylates and combinations thereof; and the term "(meth)acrylic acid" includes acrylic acid and methacrylic acid and combinations thereof.

Herein, the term "acrylic polymer" includes styrene-acrylic polymers, and means polymers comprising polymerized units of (meth)acrylates or (meth)acrylic acid or styrene, or combinations thereof, at a level of at least 50% by weight of solids as a percentage of the total weight of solids of the (co)polymer. The term "acrylic polymer" therefore includes both homopolymers and copolymers.

Herein, "glass transition temperature", Tg, is measured as known in the art by differential scanning calorimetry, DSC, by the half height method of the heat transition.

Herein, unless stated to the contrary, molecular weight refers to number average molecular weight, Mw.

Herein, the term "auxiliary binder" refers to one or more of polyethersulfone, polyphenylene sulfide, polyamide, polyimide, polyether ether ketone, polyetherimide, polyurethane, alkyd resin, polyester, or acrylic polymers.

Herein the term "hard filler" refers to inorganic filler particles having a Knoop hardness of at least 1200. Knoop hardness is a scale for describing the resistance of a material to indentation or scratching. Values for the hardness of minerals and ceramics are listed in the *Handbook of Chemistry, 77th* Edition, pp. 12-186, 187 based on reference material from Shackelford and Alexander, *CRC Materials Science and Engineering Handbook*, CRC Press, Boca Raton Fla., 1991. Examples of inorganic filler particles having a Knoop hardness value of 1200 or greater than 1200 are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850).

The coating composition, and the anticorrosion film derived therefrom, comprises one or more fluoropolymer. The fluoropolymer mainly provides dry layers of the coating with properties including self-lubricating, non-adhesive, thermal resistant properties and low-friction coefficient.

The fluoropolymer of the invention may be a homopolymer or copolymer consisting of polymerized units of fluorinated monomers only or of fluorinated and non-fluorinated monomers, and may include any fluoropolymer which is commonly used in coating compositions, such as, for example, polytetrafluoroethylene polymers, tetrafluoroethylene-hexafluoropropylene copolymer, tetrafluoroethylene-perfluorinated alkyl vinyl ether copolymer, ethylene-tetrafluoroethylene copolymer, polyvinyl fluoride, polyvinylidene fluoride, polyhexafluoropropylene, ethylene-hexafluoropropylene copolymer, ethylene-vinyl fluoride copolymer, or any combination thereof.

The fluoropolymers for use in this invention can be a non melt-fabricable fluoropolymer with a melt viscosity of at least $1 \times 10^7$ Pa·s. One embodiment is polytetrafluoroethylene (PTFE) having a melt viscosity of at least $1 \times 10^8$ Pa·s at 380° C. Such PTFE can also contain a small amount of comonomer modifier which improves film-forming capability during baking (fusing), such as perfluoroolefin, notably hexafluoropropylene (HFP) or perfluoro(alkyl vinyl)ether, notably wherein the alkyl group contains 1 to 5 carbon atoms, with perfluoro (propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity, usually at least $1 \times 10^9$ Pa·s, but a mixture of PTFEs having different melt viscosities can be used to form the fluoropolymer component.

The fluoropolymers can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the coating application. Typically, the melt viscosity will be at least $1 \times 10^2$ Pa·ss and may range up to about 60-100×10³ Pa·ss as determined at 372° C. according to ASTM D-1238.

In an embodiment, the fluoropolymer component is a blend of non melt-fabricable fluoropolymer with a melt viscosity in the range from $1\times10^7$ to $1\times10^{11}$ Pa·s and melt fabricable fluoropolymer with a viscosity in the range from $1\times10^3$ to $1\times10^5$ Pa·s.

The fluoropolymer component is generally commercially available, either as a powder, or as a dispersion of the polymer in water. By "dispersion" is meant that the fluoropolymers particles are stably dispersed in the aqueous medium, so that settling of the particles does not occur within the time when the dispersion will be used. This may be achieved by utilizing a small size of fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Useful fluoropolymers also include those commonly known as micropowders. These fluoropolymers generally have a melt viscosity $1\times10^2$ Pa·s to $1\times10^6$ Pa·s at 372° C. Such polymers include but are not limited to those based on the group of polymers known as tetrafluoroethylene (TFE) polymers. The polymers may be directly polymerized or made by degradation of higher molecular weight PTFE resins. TFE polymers include homopolymers of TFE (PTFE) and copolymers of TFE with such small concentrations of copolymerizable modifying comonomers (<1.0 mole percent) that the resins remain non-melt-processible (modified PTFE). The modifying monomer can be, for example, hexafluoropropylene (HFP), perfluoro(propyl vinyl)ether (PPVE), perfluorobutyl ethylene, chlorotrifluoroethylene, or other monomer that introduces side groups into the molecule.

The fluoropolymer component may, for example, be a mixture of polytetrafluoroethylene and ethylene-tetrafluoroethylene copolymer; or a mixture of polytetrafluoroethylene and tetrafluoroethylene-hexafluoropropylene copolymer; or a mixture of polytetrafluoroethylene and tetrafluoroethylene-perfluorinated alkyl vinyl ether copolymer; or a mixture of tetrafluoroethylene-hexafluoropropylene copolymer and ethylene-tetrafluoroethylene copolymer; or a mixture of polytetrafluoroethylene and polyvinyl fluoride; or a mixture of tetrafluoroethylene-hexafluoropropylene copolymer and polyvinyl fluoride; or a mixture of tetrafluoroethylene-perfluorinated alkyl vinyl ether copolymer and ethylene-tetrafluoroethylene copolymer; or a mixture of tetrafluoroethylene-perfluorinated alkyl vinyl ether copolymer and polyvinyl fluoride.

Fluoropolymers comprising polymerized units of fluorohydrocarbon monomers, such as polyvinylfluoride and polyvinylidenefluoride, or comprising polymerized units of perfluorinated monomers together with monomers that are not perfluorinated, such as polyethylene-tetrafluoroethylene copolymer, may also find utility in the aqueous coating compositions. However, perfluorinated fluoropolymers, or a mixture of two or more perfluorinated polymers, are preferred. A particularly suitable fluoropolymer is polytetrafluoroethylene (PTFE), or a mixture of two or more polytetrafluoroethylene (PTFE) polymers.

In an embodiment, the one or more fluoropolymer comprises one or more perfluorinated polymer. In one such embodiment, the perfluorinated polymer is polytetrafluoroethylene (PTFE).

In another embodiment, the one or more fluoropolymer comprises only perfluorinated polymers. In one such embodiment, the one or more fluoropolymer comprises only polytetrafluoroethylene (PTFE). In one such embodiment, the one or more fluoropolymer comprises a mixture of two or more polytetrafluoroethylene (PTFE) polymers.

In another embodiment, the one or more fluoropolymer comprises a mixture of two or more perfluorinated polymers. In one embodiment of this type, two of the two or more perfluorinated polymers differ in particle size. In one embodiment of this type, two of the two or more perfluorinated polymers differ in particle size by a factor of from 5 to 20. In another embodiment of this type, two of the two or more perfluorinated polymers differ in melt viscosity. In an embodiment, two of the two or more perfluorinated polymers differ in melt viscosity by a factor of from 5 to $10^7$; or differ by a factor of from 5 to 200; or differ by a factor of from 10 to 100.

In an embodiment, the anticorrosion coating composition, and the anticorrosion film derived therefrom, comprises a fluoropolymer having a number average molecular weight of 40,000-1,110,000; in an embodiment, the fluoropolymer has a molecular weight of 60,000-700,000; in an embodiment, the fluoropolymer has a molecular weight of 90,000-500,000.

In an embodiment, the fluoropolymer has a melt flow rate of 1.0-50 g/10 min; in an embodiment, the fluoropolymer has a melt flow rate of 2.3-45 g/10 min; in an embodiment, the fluoropolymer has a melt flow rate of 5-25 g/10 min.

In an embodiment, the fluoropolymer has an average particle diameter of 3-20 micrometer; in an embodiment, the fluoropolymer has an average particle diameter of 5-15 micrometer; in an embodiment, the fluoropolymer has an average particle diameter of 8-12 micrometer.

The fluoropolymer used in the invention may be purchased in the markets. For example, it may be purchased from DuPont Company (Wilmington, Del., USA) in the trade names of either Teflon® or Zonyl®.

In an embodiment, in the case that the fluoropolymer used in the invention comprises polytetrafluoroethylene resin, the melt flow rate of the polytetrafluoroethylene resin may be 2.3-45 g/10 min, and its average particle diameter $d_{50}$ may be 3-12 micrometer.

The coating composition may comprise 1-35% by weight of fluoropolymer, for example, in an embodiment it may comprise 10-35%, or 10-30%, or 10-26% by weight of fluoropolymer, or it may comprise 17-35%, or 17-30% by weight of fluoropolymer, or, in an embodiment it may comprise 19-31% or 19-26% by weight of fluoropolymer, or in an embodiment it may comprise 21-31% by weight of fluoropolymer.

The anticorrosion film may comprise 1-35% by weight of fluoropolymer, for example, in an embodiment it may comprise 10-35%, or 10-30%, or 10-26% by weight of fluoropolymer, or it may comprise 17-35%, or 17-30% by weight of fluoropolymer, or, in an embodiment it may comprise 19-31% or 19-26% by weight of fluoropolymer, or in an embodiment it may comprise 21-31% by weight of fluoropolymer.

The anticorrosion coating composition, and the anticorrosion film derived therefrom, comprises at least two binder polymers. The binder polymers, including polyamideimide and an epoxy resin, provide a balance of properties, including improving the adhesion to the substrate and the density of the anticorrosion film (also known as anti-corrosive coating), changing barrier performance of the anti-corrosive coating, dispersing pigments, adjusting electrical performance of the final product, providing an appropriate coating process and extending the service life of the coating film.

The anticorrosion coating composition, and the anticorrosion film derived therefrom, comprises one or more polyamideimide or polyamic acid or salt thereof. In an embodiment, a small quantity of organic solvent may be added along with the dispersing binder for ease of addition and to aid in the film formation. Such solvents include N-methylpyrrolidone (NMP), dimethylformamide, dimethylacetamide, dimethylsulfoxide, and cresylic acid, which will depend on the particular dispersing polymer being used. NMP is a preferred solvent because of its relative safety and environmental acceptability. One skilled in the art will recognize that mixtures of solvents can be used.

In an embodiment, the polyamideimide has a number average molecular weight of no greater than about 20,000, and preferably no greater than 15,000.

The viscosity of the polyamideimide may be 0.9-5.9 Pa·s at 25° C.; preferably 1.0-3.5 Pa·s; and more preferably 1.1-2.6 Pa·s.

In an embodiment, the tensile strength (ASTM D 638) of the polyamideimide is 95-110 MPa when the polymer is formed into a film shape; preferably 98-105 MPa; and more preferably 0.96-0.98 Pa·s at 30° C.

In an embodiment, the glass transition temperature, Tg, (ASTM E-1356) of the polyamideimide resin is 200-300° C.; preferably 210-290° C.; and more preferably 220-280° C.

The polyamideimide can be purchased from the markets. For instance, polyamideimide resins can be purchased from the Hitachi Chemical Company (Japan), for example, product serial numbers HPC-6000A-26D, HPC-6000A-28, HPC-1000A-28 and HI-680. Polyamic acid solutions may also be used, such as Polyamic Acid A-10 from Amoco (BP group, London, UK).

Based on the total weight of solids of all components in the coating composition, the coating composition may comprise 5-70%, or 10-70%, by weight of the one or more polyamideimide, or, in an embodiment, 20-70%, or 20-60%, by weight, or, in an embodiment, 25-58%, or 25-50%, by weight, or, in an embodiment, 30-51.5%, or 30-40%, by weight of polyamideimide.

In an embodiment, the anticorrosion coating composition comprises 6-17% by weight of the one or more polyamideimide resins, or, in an embodiment, 7-15% by weight of polyamideimide.

In another embodiment, the anticorrosion coating composition comprises 17% or more than 17% by weight of the one or more polyamideimide resin, for example, 17-55% by weight, or 20-50% by weight.

Based on the total weight of solids of all components in the film, the anticorrosion film may comprise 5-70%, or 10-70%, by weight of the one or more polyamideimide, or, in an embodiment, 20-70%, or 20-60%, by weight, or, in an embodiment, 25-58%, or 25-50%, by weight, or, in an embodiment, 30-51.5%, or 30-40%, by weight of polyamideimide.

In an embodiment, the anticorrosion film comprises 6-17% by weight of the one or more polyamideimide resins, or, in an embodiment, 7-15% by weight of polyamideimide.

In another embodiment, the anticorrosion film comprises 17% or more than 17% by weight of the one or more polyamideimide resin, for example, 17-55% by weight, or 20-50% by weight.

The anticorrosion coating composition, and the anticorrosion film derived therefrom, comprises one or more epoxy resin. No special conditions apply to epoxy resins which can be used in the aforementioned anticorrosion coating composition. Any epoxy resin containing epoxy groups known in the art may be suitable, such as, for example, polymers containing glycidyl ester groups (such as polyacrylic acid glycidyl ester and polymethacrylic acid glycidyl ester), Bisphenol A Diglycidyl Ether (such as Bisphenol A-epichlorohydrin epoxy resin), or a combination thereof. Glycidyl ether epoxy resin is commonly used.

In an embodiment, the viscosity (at 25° C.) of the epoxy resin suitable for making the anticorrosion coating composition is 5.0-15500 mPa·s; or, in an embodiment, it may be 6.0-13500 mPa·s.

The coating composition comprises 1-70% by weight of epoxy resin, for example, in an embodiment, 1-15% by weight, or 1-12% by weight, or 2-10% by weight, or 2-6% by weight of epoxy resin. In another embodiment, the anticorrosion coating composition comprises 15% or more than 15% by weight of epoxy resin, for example, 15-70% by weight of epoxy resin, or 20-60%, or 20-50%, by weight of epoxy resin.

The anticorrosion film comprises 1-70% by weight of epoxy resin, for example, in an embodiment, 1-15% by weight, or 1-12% by weight, or 2-10% by weight, or 2-6% by weight of epoxy resin. In another embodiment, the anticorrosion coating composition comprises 15% or more than 15% by weight of epoxy resin, for example, 15-70% by weight of epoxy resin, or 20-60%, or 20-50%, by weight of epoxy resin.

The epoxy resin can be purchased from the markets. For example, epoxy resins can be purchased from the Hitachi Chemical Company (Japan), such as serial number HPC-6000B-26D. Alternatively, epoxy resin emulsions can be purchased from Cytec Specialty Chemical, for example, serial number of EP__147W.

The anticorrosion coating composition, and the anticorrosion film derived therefrom, optionally may also comprise a second binder polymer, referred to herein as an auxiliary binder polymer or an auxiliary binder. The auxiliary binder may be one or more of the following: polyethersulfone, polyphenylene sulfide, polyamide (nylon), polyimide, polyether ether ketone, polyetherimide, polyurethane, alkyd resin, polyester, or acrylic polymers.

In an embodiment, the auxiliary binder comprises an acrylic polymer, which acrylic polymer comprises polymerized units of (meth)acrylic acid, or $C_{1-8}$ alkyl(meth)acrylate, or a combination thereof. In one such embodiment, the acrylic polymer comprises polymerized units of a phosphorus-containing monomer, such as phosphoethyl (meth)acrylate.

In an embodiment, the glass transition temperature, Tg, (ASTM E-1356) of the auxiliary binder is in the range of 200-240° C.; or, 210-230° C.

In an embodiment, the auxiliary binder is polyethersulfone or a mixture of polyethersulfone and any of the above component(s). Alternatively, the auxiliary binder may be polyphenylene sulfide, or a mixture of polyphenylene sulfide and any of the above component(s).

Polyethersulfone can be purchased from the markets. For example, it can be purchased in the trade names of Radel™ A-304P or Radel™ A-704P from Solvay Advanced Polymers L.L.C (Dusseldorf, Germany); alternatively, polyethersulfone powders can also be purchased in the trade name of PES 4100 mp from Sumitomo Chemical Co., Ltd. (Tokyo, Japan). Polyphenylene sulfide is available as the resin Ryton™ V-1 (Conoco-Phillips, Houston, Tex., USA). Acrylic polymers are available, for example, under the tradenames Paraloid™, Maincote™, Rhoplex™ and Avanse™ (for example, Paraloid™ A-21 or XR-34; Maincote™ HG-54, Rhoplex™ WL-71; Avanse™ MV-100) from Dow Chemical Company (Midland, Mich., USA). Alkyd resins or solutions, for example, under the tradenames Beckosol™, Amberlac™ and Kelsol™, (such as, for example, Beckosol™ 1271) as well as urethanes, for example, under the tradename Urotuf™, (such as Urotuf™ L-60-45) are available from Reichhold (Research Triangle Park, N.C., USA).

Based on the dehydrated weight of all components in the anticorrosion coating composition, the composition comprises 0-40% by weight of one or more auxiliary binder, for example, in an embodiment, 1-40%, or 5-38% by weight, or 15-35% by weight, or 19-34%, or 1-10%, by weight of auxiliary binder.

Based on the dehydrated weight of all components in the anticorrosion film, the anticorrosion film comprises 0-40% by weight of one or more auxiliary binder, for example, in an embodiment, 1-40%, or 5-38% by weight, or 15-35% by weight, or 19-34%, or 1-10%, by weight of auxiliary binder.

The anticorrosion coating composition also comprises a solvent system consisting of one or more non-aqueous solvents, or water and emulsifier, or water and dispersion agent, or a mixture of one or more non-aqueous solvents and water.

Suitable non-aqueous solvent may be any non-aqueous solvent which is commonly used in coating, there being no special limitation as long as it can evenly dissolve or disperse all components in the anticorrosion coating composition. Moreover, it should be suitable for coating.

Non-limiting examples of solvents that may be suitable are given as follows: benzene, $C_{1-6}$ alkyl-substituted benzenes (such as toluene, ethyl benzene, propyl benzene, n-butylbenzene, or a mixture of any two or more than two components above); di-($C_{1-6}$ alkyl)-substituted benzenes (such as o-xylene, meta-xylene, paraxylene, o-diethyl-benzene, meta-diethylbenzene, para-diethylbenzene, o-dipropyl-benzene, meta-dipropylbenzene, para-dipropylbenzene, or a mixture of any two or more than two components above); one or several $C_{1-4}$ alkyl substituted pyrrolidones (such as N,N-dimethyl-pyrrolidone, N-methyl-2-pyrrolidone, or a mixture of the two); esters (such as γ-butyrolactone, n-butyl acetate, or a mixture of the two); ethers (ethylene glycol monoethyl ether, ethylene glycol monobutyl ether, diethylene glycol monobutyl ether, or a mixture of any two or more than two of the above ethers); alcohols (such as furanol, isobutyl alcohol, n-propanol, or a mixture of any two or more than two of the above alcohols); acids (such as ethanoic acid, propionic acid or a mixture of the two acids); halohydrocarbon (such as chloroform, 1,2-dichloroethane, or a mixture of the two); or a mixture of any two or more than two solvents above.

The mixture of the non-aqueous solvents and water may be the solution or dispersion of polar organic solvent dissolved into water; moreover, it can also be the emulsion of the polar or non-polar organic solvent in water with a dispersion agent or emulsifier. Based on their technical expertise, ordinary technicians working in the field are able to identify the suitable organic solvents, emulsifier and/or dispersion agent and the amounts in accordance with a specific purpose.

As long as a solvent can dissolve or disperse all components of fluoropolymer, all binder components, and all components of other additives, it should be suitable for applying the coating composition, there being no special limitation with regard to the amount of the solvent (including a mixture of any of the aforementioned non-aqueous solvents, water, emulsifier or dispersion agent, and a mixture of the non-aqueous solvent and water) used in the anticorrosion coating composition. Therefore, as used herein, the term "solubly or dispersibly effective amount of solvent", or simply "an effective amount of solvent", means a sufficient amount of the solvent to dissolve or disperse (or emulsify) all components of fluoropolymer, all binder polymer components, and all components of other additives as well as being suitable for applying the coating composition.

The solvents (including the aforementioned non-aqueous solvents, or a mixture of the aforementioned non-aqueous solvents and water) contained in the anticorrosion coating composition can be selected from or partially selected from the solvents contained in dissolved or dispersed substances and/or from addition solvents used in formulating the coating composition.

In an embodiment, fluoropolymer solution, epoxy resin solution, the polyamideimide solution and the auxiliary binder solution are used in formulating the anticorrosion coating composition. In the event that the total amount of solvents in the above solutions are sufficient to dissolve or disperse all components of the anticorrosion coating composition, then no additional solvent is needed in the formulation.

In an embodiment, on the basis of the composition's dry weight being 100% by weight, the composition comprises 100-400% by weight of the one or more solvents, such as, for example, in an embodiment, 130-350% by weight of solvents, or 180-300% by weight of solvents.

In an embodiment, the anticorrosion coating composition comprises:
  3-35% by weight of one or more fluoropolymer;
  2-60% by weight of one or more epoxy resin;
  6-55% by weight of one or more polyamideimide;
  7-40% by weight of an auxiliary binder consisting of one or more of polyethersulfone, polyphenylene sulfide, polyamide (such as nylon), polyimide, polyether ether ketone, polyetherimide, polyurethane, alkyd resin, polyester, or acrylic polymers; and 130-350% by weight of solvent, based on the total weight (dry weight) of the above components.

In an embodiment, the anticorrosion coating composition comprises:
  10-35% by weight of one or more fluoropolymer;
  1-15% by weight of one or more epoxy resin;
  17-55% by weight of one or more polyamideimide;
  8-34% by weight of an auxiliary binder consisting of one or more of polyethersulfone, polyphenylene sulfide, polyamide (such as nylon), polyimide, polyether ether ketone, polyetherimide, polyurethane, alkyd resin, polyester, or acrylic polymers; and a solubly or dispersibly effective amount of non-aqueous solvent.

In an embodiment, the anticorrosion coating composition comprises:
  8-35% by weight of one or more fluoropolymer;
  15-70% by weight of one or more epoxy resin;
  6-17% by weight of one or more polyamideimide;
  5-35% by weight of an auxiliary binder consisting of one or more of polyethersulfone, polyphenylene sulfide, polyamide (such as nylon), polyimide, polyether ether ketone, polyetherimide, polyurethane, alkyd resin, polyester, or acrylic polymers; and a solubly or dispersibly effective amount of a mixture of water and non-aqueous solvent.

The anticorrosion coating composition may also comprise a variety of coloring agents, pigments and/or dyestuff. These may include a range of conventional inorganic or organic coloring agents, pigments and/or dyestuff known in the field. After reading the contents disclosed herein, ordinary technicians working in the field may easily identify the right coloring agents, pigments and/or dyestuff in accordance with specific requirements.

The aqueous coating composition may comprise either one or more inorganic filler, or one or more inorganic pigment, or a combination thereof. The inorganic filler and pigment particles are one or more filler or pigment type materials which are inert with respect to the other components of the composition and thermally stable at its cure temperature which fuses the fluoropolymer and binder. The filler is insoluble in solvents so that it is typically uniformly dispersible but not dissolved in the dispersion of the composition of the invention.

Suitable fillers and pigments as known in the art may be utilized including particles of calcium carbonate, aluminum oxide, calcined aluminum oxide, silicon carbide etc. as well as glass flake, glass bead, glass fiber, aluminum or zirconium silicate, mica, metal flake, metal fiber, fine ceramic powders, silicon dioxide, barium sulfate, talc, etc. Preferred fillers/pigments include titanium dioxide and metal phosphates and mixed metal phosphates such as zinc phosphate, zinc aluminum phosphate and calcium zinc phosphate. Surface pre-treated pigments as known in the art are commonly available from manufacturers and generally these are also suitable. The levels of fillers and pigments is not particularly limited although high levels, for example, a level in combination of greater than 50% by weight of total solids, are usually unsuitable for corrosion resistant coatings. Preferably the combined weight percent of pigments and fillers, as a percentage of the total weight of solids in the composition, is less than 30%, and more preferably less than 25%; In an embodiment, it is between 10% and 25%. In an embodiment, organic or inorganic liquid colorants may be used in addition to, or in place of, solid pigments. Color acceptance is an important property for marine fasteners, since many manufacturers require the marine fastener coatings to be blue. The inventive compositions described herein show good color acceptance. In another embodiment the coating composition does not include either solid pigments or colorants.

No special limitation applies to the amount of the coloring agents, pigments and/or dyes which may be added to the anticorrosion coating composition, as long as the final coating formed by the composition can be properly colored and the ultimate coating film is not adversely affected in terms of its anticorrosion property. In an embodiment, based on the total weight (dry weight) of the anticorrosion coating composition, the composition, and the anticorrosion film derived therefrom, may comprise 0-15% by weight of the coloring agents, pigments and/or dyes, such as, for example, in an embodiment, 1-10% by weight of coloring agents, pigments and/or dyes, or 1.5-8% by weight of coloring agents, pigments and/or dyes.

A preferred pigment is titanium dioxide.

In order to further enhance the hardness and anti-wear property of the fluorinated coatings, the anticorrosion coating composition may also contain a range of hard filler particles. Usually, the average diameter of the filler particles is 1-100 micrometer, such as, for example, in an embodiment, 5-50 micrometer, or 5-25 micrometer for hard filler particles. Non-limiting examples of hard filler particles are given as follows: aluminum oxide, silicon carbide, zirconium oxide and scrap metal such as aluminum scrap, zinc scrap and silver scrap. No special limitation applies to the amount of hard fillers which may be added to the anticorrosion coating composition, as long as the final coating properties are not adversely impacted. In an embodiment, based on the total weight (dry weight) of the anticorrosion coating composition, the composition, and the anticorrosion film derived therefrom, comprises 0-4% by weight of hard fillers, such as, for example, 0.5-2.5% by weight of hard fillers, or 0.8-1.2% by weight of hard fillers.

In an embodiment, the hard filler is a particulate filler having an average particle size of 1-100 microns and is selected from the group consisting of alumina, silicon carbide, zirconia and sheet-metal. Silicon carbide is the most preferred hard filler.

Additionally, the anticorrosion coating composition may also contain other conventional coating additive products, such as, for example, surface-active agent, defoaming agent, wetting agent, rust inhibitor, flame retardant, ultraviolet stabilizer, weather-proof agent, leveling agent, biocide, mildewcide, etc.

Methods of formulating such compositions are well known in the art. Although coalescents may be used, they are not required because the high temperatures used in drying and curing the composition may also be sufficient to achieve appropriate film formation for the main polymeric binder. The formulation ingredients may be combined using mechanical stirrers as known in the art, and addition of pigments and fillers may be more effectively accomplished using known high speed and/or high shear techniques using high shear stirrers such as, for example, a Cowles mixer.

The compositions of the present invention can be applied to substrates by conventional means. Spray applications are the most convenient application methods. Other well-known coating methods including dipping and coil coating are also suitable.

The substrate is preferably a metal for which corrosion resistance of the coated substrate is increased by the application of the inventive coating composition. Examples of useful substrates include aluminum, anodized aluminum, carbon steel, and stainless steel. As noted above, the invention has particular applicability to steel, such as cold rolled steel, and particularly for steel fasteners. Preferably, the substrate is pre-treated by methods which withstand the cure temperature of the coating, such as, for example, phosphate, zinc phosphate, or manganese phosphate treatments, and others as known in the art.

Prior to applying the coating composition, the substrate is preferably cleaned to remove contaminants and grease which might interfere with adhesion. Conventional soaps and cleansers can be used for cleaning. The substrate can be further cleaned by baking at high temperatures in air, at temperatures of 800° F. (427° C.) or greater. Preferably, the substrate is then grit-blasted; for example, preferably resulting in a surface roughness of 1-4 micrometers, or 3-4 micrometers. The cleaning and/or grit-blasting steps enable the coating to better adhere to the substrate.

In a preferred embodiment the coating is applied by spraying. The coating is applied to a dried film thickness (DFT) of greater than about 10 micrometers, preferably greater than about 12 micrometers and in other embodiments in ranges of about 10 to about 30 micrometers; and, preferably, about 18 to about 25 micrometers. The coating composition may be used as a single coat. However, the thickness of the coating affects the corrosion resistance. If the coating is too thin, the substrate will not be fully covered resulting in reduced corrosion resistance. If the coating is too thick, the coating will crack or form bubbles resulting in areas that will allow salt ion attack and therefore reduce corrosion resistance. The aqueous composition is applied and then dried to form the coating. Drying and curing temperature will vary based on the composition, for example, from 110° C. to 250° C., but for example may be typically a drying temperature of 120° C. for 15 minutes followed by cure at 230° C. for 25 minutes. Further coating layers may be applied, although this invokes additional heat/cure cycles; each coating layer may be dried at 120° C. for 15 minutes, and the substrate allowed to cool between coating applications, prior to final cure, which may be the same as that for the one-coat cure (230° C. for 25 minutes).

The anticorrosion coating composition is suitable for protecting a variety of metal or non-metal substrates from a range of corrosive liquids or gas such as seawater and acid fog. Non-limiting examples of the substrates include, for example, carbon steel (such as nuts, bolts, valves, pipes, pressure control valves, oil-drilling platforms and docks made from steel), stainless steel, aluminum, etc. The composition is particularly useful for fasteners, such as nuts and bolts, used in marine environments.

In an embodiment, the invention provides a coating composition comprising, based on weight percent of solids expressed as a percentage of the total weight of solids in the composition:
- (a) 1-35% by weight of one or more fluoropolymer;
- (b) 1-70% by weight of one or more epoxy resin;
- (c) 5-70% by weight of one or more polyamideimide;
- (d) 1-40% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
- a solubly or dispersibly effective amount of solvent.

In an embodiment, the invention provides an anticorrosion film comprising, as a weight percent of solids based on the total weight of solids:
- (a) 1-35% by weight of one or more fluoropolymer;
- (b) 1-70% by weight of one or more epoxy resin;
- (c) 5-70% by weight of one or more polyamideimide; and
- (d) 1-40% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

In an embodiment, the invention provides a coating composition comprising, as a weight percent of solids based on the total weight of solids:
- 10-30% by weight of one or more fluoropolymer;
- 20-60% by weight of one or more epoxy resin;
- 7-15% by weight of one or more polyamideimide;
- 5-30% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
- a solubly or dispersibly effective amount of a solvent mixture of water and non-aqueous solvent.

In an embodiment, the invention provides an anticorrosion film comprising, as a weight percent of solids based on the total weight of solids:
- 10-30% by weight of one or more fluoropolymer;
- 20-60% by weight of one or more epoxy resin;
- 7-15% by weight of one or more polyamideimide; and
- 5-30% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

In an embodiment, the invention provides a coating composition comprising, as a weight percent of solids based on the total weight of solids:
- 12-34% by weight of one or more fluoropolymer;
- 2-10% by weight of one or more epoxy resin;
- 20-50% by weight of one or more polyamideimide;
- 10-25% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
- a solubly or dispersibly effective amount of non-aqueous solvent.

In an embodiment, the invention provides an anticorrosion film comprising, as a weight percent of solids based on the total weight of solids:
- 12-34% by weight of one or more fluoropolymer;
- 2-10% by weight of one or more epoxy resin;
- 20-50% by weight of one or more polyamideimide; and
- 10-25% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

In an embodiment, the invention provides a coating composition comprising, as a weight percent of solids based on the total weight of solids:
- 20-30% by weight of one or more fluoropolymer;
- 2-10% by weight of one or more epoxy resin;
- 30-40% by weight of one or more polyamideimide;
- 10-25% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
- a solubly or dispersibly effective amount of non-aqueous solvent.

In an embodiment, the invention provides an anticorrosion film comprising, as a weight percent of solids based on the total weight of solids:
- 20-30% by weight of one or more fluoropolymer;
- 2-10% by weight of one or more epoxy resin;
- 30-40% by weight of one or more polyamideimide; and
- 10-25% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

The invention also provides an article comprising: a substrate; and an anticorrosion film disposed on the substrate, wherein the anticorrosion film results from application of any one of the aforementioned anticorrosion coating compositions.

In an embodiment, the substrate is made of steel. In an embodiment, the substrate is a steel fastener, such as a nut or bolt.

The invention also provides a method of forming an anticorrosive film on a substrate, including the steps of applying the aforementioned anticorrosion coating composition on the substrate. No special limitation applies to the methods of applying the composition to a substrate. Known methods may be suitable, including, but not limited to: brush coating, spray coating, dip-coating, roll coating, spin coating, curtain coating, or a combination thereof.

The anticorrosion coating composition and the article coated with the composition will be further elaborated in the examples, which are intended to be illustrative, but not limiting.

EXAMPLES AND TEST METHODS

Sample Preparation

Metal panels coated with the coating compositions are prepared as follows:

In order to make well-adhered and zero-defect coatings, the substrate must be clean, oil-free and without any incrustation of dirt. Therefore, oil and dirt on the surface is cleaned by grit blasting (to a surface roughness of 3~4μ). Carbon steel or aluminum plate is coated with the anti-corrosion coating composition, and is dried for 15-20 minutes at 115-130° C. Then, it is further cured for 25 minutes at 230° C. resulting in a 25±3 micrometer thickness anti-corrosion coating on the carbon-steel or aluminum plate. (The dried coating thickness, DFT, of the applied coating is measured with a film thickness instrument, e.g., Isoscope, based on the eddy-current principle, ASTM B244).

1. Corrosion Resistance Test 1-1. Salt Spray: The salt spray test follows ASTM B-117 Standard. The coated samples (prepared as described above)

are horizontally placed in a salt mist box (the "Q-FOG", Q-Panel Laboratory Products, 26200 First Street, Cleveland, Ohio, USA) at a constant temperature of 35±1.1° C. 5% sodium chloride solution is sprayed into the box (at a rate of 80 cm$^2$ per hour) until 1.0-2.0 ml sodium chloride solution is concentrated on the sample. The degree of corrosion on the anti-corrosion coating can be judged by the amount of blistering or rust spots on the coatings. If the rust-stained area accounts for over 15%, the test is stopped and the time recorded for the test is treated as the result of the salt spray corrosion test. The test proceeds for up to 400 hours, after which time if the rust spot or blistering account for less than 15% of the coating surface the test is stopped and the result of the salt spray corrosion test is taken to be >400 hours.

1-2. Atlas Test: Sample preparation is identical to that described above for the salt spray test. The coated panels are immersed in 5% sodium chloride solution at 100° C. for 100 hours and then tested for extent of rust formation and ease of film peeling off the substrate after the immersion. The test specimen is considered to have failed if the rust-stained area accounts for over 15%, or if the coating is easily peeled from the substrate.

2. Pencil Hardness Test

The test is done according to ASTM D-3363-05 Standard. Sample preparation is identical to that described above. The hardness of the paint films was assessed by pencil hardness, a standard industry test. Pencils of a range of hardness (from soft to hard: 4B, 3B, 2B, HB, F, H, 2H, 3H, 4H; Pencil: Uni, MITSU-BISHI) are prepared with approximately 3 mm of lead exposed.

Test panels are prepared with the test coatings. Starting with the softest pencil, the pencil point is moved forward on the coating surface at an angle of 45. The mark is examined with a magnifier or microscope to see if the lead has cut into the film. The procedure is followed with pencils of increasing hardness until the first pencil that cuts into the film is identified. The hardness rating of the previous pencil is the rated hardness of the film.

3. Rub-Resistance Test

The rub-resistance test is done according to ASTM D 4060 Standard. Sample preparation is identical to that described above. Grind 4×250 cycles on the surface of the anti-corrosion coating sample with two 1 kg CS17 grinding wheels and weigh the sample. The difference of the sample's weights before and after the grinding is treated as the result of the rub-resistance test.

4. Adhesion Test with Boiling Water—the Crosshatch Method

The test procedure follows that of ASTM D3359. The test is done in duplicate. The coated steel panels are prepared as described above and the sample is placed in boiling water for 15 minutes. Afterwards, the test is immediately performed according to ASTM D 3359-97 Standard. The dry paint film is scored with a blade through the coating with a grid template having 1 mm spacings. Adhesive tape (Scotch Tape, 3M, St. Paul, Minn., USA) is pressed down evenly on each coating surface over the scored area, and then pulled up evenly at a 90 degree angle. Adhesion to the substrate is evaluated according to the amount of the paint film that is removed by the tape (expressed as a percentage).

Example 1

N-Methyl-pyrrolidinone, methylisobutylketone and xylene are successively charged to a container in turns in weight ratio of 13.49:6.29:1.08 and then stirred for 10 minutes. Then polyamideimide solution (25% by weight of polyamideimide dissolved in N-Methyl-2-pyrrolidinone), epoxy resin solution (25% by weight of bisphenol A-epichlorohydrin epoxy resin dissolved in N-Methyl-2-pyrrolidinone) and polyphenylene sulfide in weight ratio of 63.48:1.46:11.70 are successively added into the container and stirred for 30 mins. Afterwards, polytetrafluoroethylene powder, phthalocyanine blue pigment and titanium dioxide in weight ratio of 1:1.13:0.38 are slowly added into the container, stirred for another 30 minutes and ground twice with a Netzsch grinding machine made in Germany. Finally, the anti-corrosion coating is produced from the process.

TABLE 1

Formulation of Example 1.
Example 1

| Ingredient | Wt % in liquid | Ingredient Solid/% | Solids (grams in 100 g) | % Solid in dry film |
|---|---|---|---|---|
| NMP | 13.49 | 0 | 0 | 0 |
| Xylene | 1.08 | 0 | 0 | 0 |
| MIBK | 6.29 | 0 | 0 | 0 |
| PAI | 63.48 | 25 | 15.87 | 52.13 |
| Epoxy | 1.46 | 25 | 0.36 | 1.20 |
| PPS | 11.7 | 100 | 11.70 | 38.43 |
| PTFE | 1.0 | 100 | 1.00 | 3.28 |
| Blue | 1.13 | 100 | 1.13 | 3.71 |
| TiO2 | 0.38 | 100 | 0.38 | 1.25 |
| | 100.0 | | 30.45 | 100.0 |

Metal panels are then coated with the coating compositions and tested as described above. The results are shown in Table 9.

Example 2

N-Methyl-pyrrolidinone, methylisobutylketone and xylene are successively charged to a container in weight ratio of 20.30:16.70:0.76 and then stirred for 10 minutes. Then polyamideimide solution (25% by weight of polyamideimide dissolved in N-Methyl-2-pyrrolidinone), epoxy resin solution (25% by weight of bisphenol A-epichlorohydrin epoxy resin dissolved in N-Methyl-2-pyrrolidinone), polyethersulfone and polyphenylene sulfide in weight ratio of 41.20:5.46:3.67:1.80 are successively added into the container and stirred for 30 mins. Afterwards, polytetrafluoroethylene powder, phthalocyanine blue pigment and titanium dioxide in weight ratio of 7.12:2.33:0.68 are slowly added into the container, stirred for another 30 minutes and ground twice with a Netzsch grinding machine made in Germany. Finally, the anti-corrosion coating is produced from the process.

TABLE 2

Formulation of Example 2.
Example 2

| Ingredient | Wt % in liquid | Ingredient Solid/% | Solids (grams in 100 g) | % Solid in dry film |
|---|---|---|---|---|
| NMP | 20.3 | 0 | 0 | 0 |
| Xylene | 0.76 | 0 | 0 | 0 |
| MIBK | 16.7 | 0 | 0 | 0 |
| PAI | 41.2 | 25 | 10.30 | 37.78 |
| Epoxy | 5.45 | 25 | 1.36 | 5.00 |
| PES | 3.67 | 100 | 3.67 | 13.47 |
| PPS | 1.8 | 100 | 1.80 | 6.60 |
| PTFE | 7.12 | 100 | 7.12 | 26.11 |

TABLE 2-continued

Formulation of Example 2.
Example 2

| Ingredient | Wt % in liquid | Ingredient Solid/% | Solids (grams in 100 g) | % Solid in dry film |
|---|---|---|---|---|
| Blue | 2.33 | 100 | 2.33 | 8.53 |
| TiO2 | 0.68 | 100 | 0.68 | 2.50 |
| | 100.0 | | 27.26 | 100.0 |

Metal panels are then coated with the coating compositions and tested as described above. The results are shown in Table 9.

Example 3

N-Methyl-pyrrolidinone, methylisobutylketone and xylene are successively charged to a container in weight ratio of 24.28:16.68:0.78 and then stirred for 10 minutes. Then polyamideimide solution (25% by weight of polyamideimide dissolved in N-Methyl-2-pyrrolidinone), epoxy resin solution (25% by weight of bisphenol A-epichlorohydrin epoxy resin dissolved in N-Methyl-2-pyrrolidinone) and polyethersulfone in weight ratio of 41.86:3.45:2.00 are successively added into the container and stirred for 30 mins. Afterwards, polytetrafluoroethylene powder, phthalocyanine blue pigment and titanium dioxide in weight ratio of 7.93:2.33:0.68 are slowly added into the container, stirred for another 30 minutes and ground twice with a Netzsch grinding machine made in Germany. Finally, the anti-corrosion coating is produced from the process.

TABLE 3

Formulation of Example 3.
Example 3

| Ingredient | Wt % in liquid | Ingredient Solid/% | Solids (grams in 100 g) | % Solid in dry film |
|---|---|---|---|---|
| NMP | 24.28 | 0 | 0 | 0 |
| Xylene | 0.78 | 0 | 0 | 0 |
| MIBK | 16.68 | 0 | 0 | 0 |
| PAI | 41.86 | 25 | 10.46 | 43.12 |
| Epoxy | 3.45 | 25 | 0.86 | 3.55 |
| PES | 2.00 | 100 | 2.00 | 8.24 |
| PTFE | 7.93 | 100 | 7.93 | 32.68 |
| Blue | 2.33 | 100 | 2.33 | 9.60 |
| TiO2 | 0.68 | 100 | 0.68 | 2.80 |
| | 100.0 | | 24.27 | 100.0 |

Metal panels are then coated with the coating compositions and tested as described above. The results are shown in Table 9.

Example 4

N-Methyl-pyrrolidinone, methylisobutylketone and xylene are successively charged to a container in weight ratio of 8.36:3.19:0.67 and then stirred for 10 minutes. Then polyamideimide solution (25% by weight of polyamideimide dissolved in N-Methyl-2-pyrrolidinone), epoxy resin solution (25% by weight of bisphenol A-epichlorohydrin epoxy resin dissolved in N-Methyl-2-pyrrolidinone) and polyethersulfone in weight ratio of 75.58:3.42:2.01 are successively added into the container and stirred for 30 mins. Afterwards, polytetrafluoroethylene powder, phthalocyanine blue pigment and titanium dioxide in weight ratio of 3.30:1.80:0.67 are slowly added into the container, stirred for another 30 minutes and ground twice with a Netzsch grinding machine made in Germany. Then add 1.00 weight % of silicon carbide product (Microgrit™ SiC Dark F1000-D, Micro Abrasives Corp.) into the semi-finished ground and continue stirring it for 10 minutes. Finally, the anti-corrosion coating is produced from the process.

TABLE 4

Formulation of Example 4.
Example 4

| Ingredient | Wt % in liquid | Ingredient Solid/% | Solids (grams in 100 g) | % Solid in dry film |
|---|---|---|---|---|
| NMP | 8.36 | 0 | 0 | 0 |
| Xylene | 0.67 | 0 | 0 | 0 |
| MIBK | 3.19 | 0 | 0 | 0 |
| PAI | 75.58 | 25 | 18.89 | 66.23 |
| Epoxy | 3.42 | 25 | 0.85 | 3.00 |
| PES | 2.01 | 100 | 2.01 | 7.04 |
| PTFE | 3.30 | 100 | 3.30 | 11.57 |
| Blue | 1.80 | 100 | 1.80 | 6.31 |
| TiO2 | 0.67 | 100 | 0.67 | 2.35 |
| SiC | 1.00 | 100 | 1.00 | 3.50 |
| | 100.0 | | 28.53 | 100.0 |

Metal panels are then coated with the coating compositions and tested as described above. The results are shown in Table 9.

Example 5

N-Methyl-pyrrolidinone, methylisobutylketone and xylene are successively charged to a container in weight ratio of 29.28:10.68:0.78 and then stirred for 10 minutes. Then polyamideimide solution (25% by weight of polyamideimide dissolved in N-Methyl-2-pyrrolidinone), epoxy resin solution (25% by weight of bisphenol A-epichlorohydrin epoxy resin dissolved in N-Methyl-2-pyrrolidinone) and polyethersulfone in weight ratio of 44.37:3.45:3.00 are successively added into the container and stirred for 30 mins. Afterwards, polytetrafluoroethylene powder, a mixture of tetrafluoroethylene and perfluoroalkyl vinyl ether copolymer, phthalocyanine blue pigment and titanium dioxide in weight ratio of 6.34:1.29:0.63:0.18 are slowly added into the container, stirred for another 30 minutes and ground twice with a Netzsch grinding machine made in Germany. Finally, the anti-corrosion coating is produced from the process.

TABLE 5

Formulation of Example 5.
Example 5

| Ingredient | Wt % in liquid | Ingredient Solid/% | Solids (grams in 100 g) | % Solid in dry film |
|---|---|---|---|---|
| NMP | 29.28 | 0 | 0 | 0 |
| Xylene | 0.78 | 0 | 0 | 0 |
| MIBK | 10.68 | 0 | 0 | 0 |
| PAI | 44.37 | 25 | 11.09 | 47.41 |
| Epoxy | 3.45 | 25 | 0.86 | 3.69 |
| PES | 3.00 | 100 | 3.00 | 12.82 |
| PTFE | 6.34 | 100 | 6.34 | 27.10 |
| FEP | 1.29 | 100 | 1.29 | 5.51 |
| Blue | 0.63 | 100 | 0.63 | 2.69 |

TABLE 5-continued

Formulation of Example 5.
Example 5

| Ingredient | Wt % in liquid | Ingredient Solid/% | Solids (grams in 100 g) | % Solid in dry film |
|---|---|---|---|---|
| TiO2 | 0.18 | 100 | 0.18 | 0.77 |
|  | 100.0 |  | 23.39 | 100.0 |

Metal panels are then coated with the coating compositions and tested as described above. The results are shown in Table 9.

Example 6

Deionized water, glacial acetic acid (9%), N-Methyl-pyrrolidinone, non-ionic surfactant (Tergitol™ TMN-6, 90% aqueous, surfactant, Dow Chemical, Midland, Mich., USA), defoaming agent (Surfynol™ 440, Air Products, Allentown, Pa., USA) and ethylene glycol monobutyl ether in weight ratio of 17.45:5.87:16.81:1.98:0.47:1.77 are successively charged to a container and then stirred for 10 minutes. Then polytetrafluoroethylene powder and polyethersulfone powder in weight ratio of 6.48:5 are successively added into the container and stirred for 30 mins. Afterwards, furfuryl alcohol and polyamideimide solution (28% solid contents) in weight ratio of 1.47:20.02 are added into the container and continuously stirred for 30 mins. Then titanium dioxide and phthalocyanine blue pigment in weight ratio of 0.59:1.53 are slowly added into the container, continuously stirred for 30 mins and ground twice with the Netzsch grinding machine made in Germany. In this way, the semi-finished anti-corrosion coating is produced from the process. Then water-based epoxy resin emulsion and silicon carbide in weight ratio of 20.06:0.5 are put into the semi-finished product and stirred for 20 minutes. Finally, the anti-corrosion coating composition is produced from the process.

TABLE 6

Formulation of Example 6.
Example 6

| Ingredient | Wt % in liquid | Ingredient Solid/% | Solids (grams in 100 g) | % Solid in dry film |
|---|---|---|---|---|
| DI Water | 17.45 | 0 | 0 | 0 |
| Acetic Acid (9%) | 5.87 | 0 | 0 | 0 |
| NMP | 16.81 | 0 | 0 | 0 |
| Surfactant | 1.98 | 0 | 0 | 0 |
| Defoamer | 0.47 | 0 | 0 | 0 |
| Ethylene Glycol Monobutylether | 1.77 | 0 | 0 | 0 |
| PTFE | 6.48 | 100 | 6.48 | 16.54 |
| PES micropowder | 5.00 | 100 | 5.00 | 12.77 |
| Furfuryl alcohol | 1.47 | 0 | 0 | 0 |
| Solvay PAI solution | 20.02 | 25 | 5.00 | 12.78 |
| TiO2 | 0.59 | 100 | 0.59 | 1.51 |
| Blue | 1.53 | 100 | 1.53 | 3.91 |
| Epoxy resin emulsion | 20.06 | 100 | 20.06 | 51.22 |
| SiC | 0.5 | 100 | 0.50 | 1.28 |
|  | 100.0 |  | 39.16 | 100.0 |

Metal panels are then coated with the coating compositions and tested as described above. The results are shown in Table 9.

Example 7

N-Methyl-pyrrolidinone, methylisobutylketone and xylene are successively charged to a container in weight ratio of 11.09:9.40:1.08 and then stirred for 10 minutes. Then polyamideimide solution (25% by weight of polyamideimide dissolved in N-Methyl-2-pyrrolidinone) and epoxy resin solution (25% by weight of bisphenol A-epichlorohydrin epoxy resin dissolved in N-Methyl-2-pyrrolidinone) in weight ratio of 67.11:2.90 are successively added into the container and continuously stirred for 30 mins. Afterwards, polytetrafluoroethylene powder, phthalocyanine blue pigment and titanium dioxide in weight ratio of 7.07:1.22:0.13 are slowly added into the container, continuously stirred for another 30 minutes and ground twice with a Netzsch grinding machine made in Germany. Finally, the anti-corrosion coating is produced from the process.

TABLE 7

Formulation of Example 7.
Example 7

| Ingredient | Wt % in liquid | Ingredient Solid/% | Solids (grams in 100 g) | % Solid in dry film |
|---|---|---|---|---|
| NMP | 11.09 | 0 | 0 | 0 |
| Xylene | 1.08 | 0 | 0 | 0 |
| MIBK | 9.40 | 0 | 0 | 0 |
| PAI | 67.11 | 25 | 16.78 | 64.72 |
| Epoxy | 2.90 | 25 | 0.72 | 2.80 |
| PTFE | 7.07 | 100 | 7.07 | 27.27 |
| Blue | 1.22 | 100 | 1.22 | 4.71 |
| TiO2 | 0.13 | 100 | 0.13 | 0.50 |
|  | 100.0 |  | 25.92 | 100.0 |

Metal panels are then coated with the coating compositions and tested as described above. The results are shown in Table 9.

Comparative Example 1

N-Methyl-pyrrolidinone, methylisobutylketone and xylene are successively charged to a container in weight ratio of 18.42:9.30:0.78 and then stirred for 10 minutes. Then polyamideimide solution (25% by weight of polyamideimide dissolved in N-Methyl-2-pyrrolidinone) and epoxy resin solution (25% by weight of bisphenol A-epichlorohydrin epoxy resin dissolved in N-Methyl-2-pyrrolidinone) in weight ratio of 56.63:2.83 are successively added into the container and continuously stirred for 30 mins. Afterwards, polytetrafluoroethylene powder, phthalocyanine blue pigment and titanium dioxide in weight ratio of 9.03:2.33:0.68 are slowly added into the container, continuously stirred for another 30 minutes and ground twice with a Netzsch grinding machine made in Germany. Finally, the anti-corrosion coating is produced from the process.

TABLE 8

Formulation of Comparative Example 1.
Comparative Example 1

| Ingredient | Wt % in liquid | Ingredient Solid/% | Solids (grams in 100 g) | % Solid in dry film |
|---|---|---|---|---|
| NMP | 18.42 | 0 | 0 | 0 |
| Xylene | 0.78 | 0 | 0 | 0 |
| MIBK | 9.30 | 0 | 0 | 0 |
| PAI | 56.63 | 25 | 14.16 | 52.62 |
| Epoxy | 2.83 | 25 | 0.71 | 2.63 |
| PTFE | 9.03 | 100 | 9.03 | 33.56 |
| Blue | 2.33 | 100 | 2.33 | 8.66 |
| TiO2 | 0.68 | 100 | 0.68 | 2.53 |
| | 100.0 | | 26.91 | 100.0 |

Metal panels are then coated with the coating compositions and tested as described above. The results are shown in Table 9.

TABLE 9

Test Results for Examples 1-7 and Comparative Example 1.

| | Ex. 1 | Ex. 2 | Ex. 3 | Ex. 4 | Ex. 5 | Ex. 6 | Ex. 7 | Comp. Ex. 1 |
|---|---|---|---|---|---|---|---|---|
| Salt Spray Test (hrs) * | 400 | 400 | 400 | 400 | 400 | 400 | 400 | <200 |
| Pencil Hardness * | ≥2H | ≥2H | ≥2H | ≥2H | ≥2H | H | 2H | H |

* Samples were coated on cleaned untreated carbon steel plates in accordance with relevant standards.

In addition to the test data above, all of the samples are tested for adhesion to substrate (cleaned untreated aluminum plates made into coated plates samples in accordance with relevant standards) using the adhesion test procedures described above (nail scratch adhesion test and crosshatch grid adhesion test after immersion in boiling water for 15 minutes). All of the samples pass the adhesion tests.

Example 8-11

Examples 8-11 are formulated as described above, but with the formulations shown in Tables 10-13. The Comparative Examples 2-5 are formulated identically to Examples 8-11, respectively, and are compositionally identical to Examples 8-11, except in each case the Comparative Example is formulated without the epoxy resin component.

TABLE 10

Formulation of Example 8.
Example 8

| Ingredient | Wt % in liquid | Ingredient Solid/% | Solids (grams in 100 g) | % Solid in dry film |
|---|---|---|---|---|
| NMP | 20.3 | 0 | 0 | 0 |
| Xylene | 0.76 | 0 | 0 | 0 |
| MIBK | 16.7 | 0 | 0 | 0 |
| PAI | 41.2 | 25 | 10.30 | 41.99 |
| Epoxy | 5.45 | 25 | 1.36 | 5.54 |
| Acrylic | 5.47 | 50 | 2.74 | 11.17 |
| PTFE | 7.12 | 100 | 7.12 | 29.03 |
| Blue | 2.33 | 100 | 2.33 | 9.50 |
| TiO2 | 0.68 | 100 | 0.68 | 2.77 |
| | 100.0 | | 24.53 | 100.0 |

TABLE 11

Formulation of Example 9.
Example 9

| Ingredient | Wt % in liquid | Ingredient Solid/% | Solids (grams in 100 g) | % Solid in dry film |
|---|---|---|---|---|
| NMP | 29.28 | 0 | 0 | 0 |
| Xylene | 0.78 | 0 | 0 | 0 |
| MIBK | 10.68 | 0 | 0 | 0 |
| PAI | 44.37 | 25 | 11.09 | 47.41 |
| Epoxy | 3.45 | 25 | 0.86 | 3.69 |
| Alkyd | 3.00 | 100 | 3.00 | 12.82 |
| PTFE | 6.34 | 100 | 6.34 | 27.10 |
| FEP | 1.29 | 100 | 1.29 | 5.51 |
| Blue | 0.63 | 100 | 0.63 | 2.69 |
| TiO2 | 0.18 | 100 | 0.18 | 0.77 |
| | 100.0 | | 23.39 | 100.0 |

TABLE 12

Formulation of Example 10.
Example 10

| Ingredient | Wt % in liquid | Ingredient Solid/% | Solids (grams in 100 g) | % Solid in dry film |
|---|---|---|---|---|
| NMP | 22.14 | 0 | 0 | 0 |
| Xylene | 0.79 | 0 | 0 | 0 |
| MIBK | 11.23 | 0 | 0 | 0 |
| PAI | 42.63 | 25 | 10.66 | 35.96 |
| Epoxy | 5.65 | 25 | 1.41 | 4.75 |
| PES | 3.80 | 100 | 3.80 | 12.82 |
| PPS | 1.87 | 100 | 1.87 | 6.31 |
| PTFE | 7.37 | 100 | 7.37 | 24.86 |
| Blue | 1.73 | 100 | 1.73 | 5.84 |
| TiO2 | 2.80 | 100 | 2.80 | 9.45 |
| | 100.0 | | 27.26 | 100.0 |

TABLE 13

Formulation of Example 11.
Example 11

| Ingredient | Wt % in liquid | Ingredient Solid/% | Solids (grams in 100 g) | % Solid in dry film |
|---|---|---|---|---|
| NMP | 24.28 | 0 | 0 | 0 |
| Xylene | 0.78 | 0 | 0 | 0 |
| MIBK | 16.68 | 0 | 0 | 0 |
| PAI | 39.42 | 25 | 9.86 | 41.67 |
| Epoxy | 3.45 | 25 | 0.86 | 3.63 |
| Urethane | 4.44 | 45 | 2.00 | 8.45 |
| PTFE | 7.93 | 100 | 7.93 | 33.52 |
| Blue | 2.33 | 100 | 2.33 | 9.85 |
| TiO2 | 0.68 | 100 | 0.68 | 2.87 |
| | 100.0 | | 23.66 | 100.0 |

In each case, metal panels are then coated with the coating compositions and tested as described above. The results are shown in Table 14.

Comparative Examples 2-5

Comparative Examples 2-5 are formulated as described above for Examples 8-11 and are compositionally identical to Examples 8-11 except without the epoxy resin component. The coated samples are assessed for corrosion resistance, shown in Table 14.

TABLE 14

Test Results for Examples 8-11 and Comparative Examples 2-5.

|  | Ex. 8 | Comp. Ex. 2 | Ex. 9 | Comp. Ex. 3 | Ex. 10 | Comp. Ex. 4 | Ex. 11 | Comp. Ex. 5 |
|---|---|---|---|---|---|---|---|---|
| Atlas Test * | Pass | Fail | Pass | Fail | Pass | Fail | Pass | Fail |
| Pencil Hardness * | ≥2H | ≥2H | ≥2H | ≥2H | ≥2H | ≥2H | ≥2H | ≥2H |

* Samples coated on cleaned untreated carbon steel plates in accordance with relevant standards.

Example 8-11 and Comparative Examples 2-5 yield similar results in terms of pencil hardness. However, the Comparative Examples fail the Atlas Corrosion Resistance Test; after immersion in the 100° C. sodium chloride solution, the coatings are easily peeled from the substrate and the panels suffer from rust formation. Examples 8-11 pass the Atlas test; after immersion in the 100° C. sodium chloride solution, the coatings cannot be peeled from the substrate and the panels have no visible rust formation.

The results show that good anticorrosion properties and film strength can be achieved when polyamideimide and epoxy binders are used together with a fluoropolymer in an appropriate ratio. The anticorrosion property of the coating can be further enhanced when one or more auxiliary binder is used. In addition, the test results show that the coating composition under the invention combines its excellent anti-corrosion property with good wear-resistance property. The coating composition of this invention is particularly suitable for protecting carbon steel, stainless steel and other metal substrates from seawater exposure.

What is claimed is:

1. An anticorrosion film comprising, as a weight percent of solids based on the total weight of solids:
    (a) 1-35% by weight of one or more fluoropolymer;
    (b) 1-70% by weight of one or more epoxy resin;
    (c) 5-70% by weight of one or more polyamideimide; and
    (d) 1-40% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

2. The anticorrosion film of claim 1, wherein the fluoropolymer is one of: polytetrafluoroethylene, tetrafluoroethylene-hexafluoropropylene copolymer, tetrafluoroethylene-perfluoroalkylvinylether copolymer, ethylene-tetrafluoroethylene copolymer, polyvinyl fluoride, polyvinylidene fluoride, polyhexafluoropropylene, ethylene-hexafluoropropylene copolymer, ethylene-vinyl fluoride copolymer, or any combination thereof.

3. The anticorrosion film of claim 1, wherein the acrylic polymer comprises polymerized units of (meth)acrylic acid, or $C_{1-8}$alkyl(meth)acrylate, or a combination thereof.

4. The anticorrosion film of claim 1, comprising, as a weight percent of solids based on the total weight of solids:
    3-35% by weight of one or more fluoropolymer;
    2-60% by weight of one or more epoxy resin;
    6-55% by weight of one or more polyamideimide; and
    7-40% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

5. The anticorrosion film of claim 1, comprising, as a weight percent of solids based on the total weight of solids:
    8-35% by weight of one or more fluoropolymer;
    15-70% by weight of one or more epoxy resin;
    6-17% by weight of one or more polyamideimide; and
    5-35% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

6. The anticorrosion film of claim 1, comprising, as a weight percent of solids based on the total weight of solids:
    10-35% by weight of one or more fluoropolymer;
    1-15% by weight of one or more epoxy resin;
    17-55% by weight of one or more polyamideimide; and
    8-34% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers.

7. The anticorrosion film of claim 1, further comprising:
    1-15% by weight of one or more colorant, pigment or dye; and
    0.5-4% by weight of one or more hard fillers.

8. The anticorrosion film of claim 7, wherein the hard filler is a particulate filler having an average particle size of 1-100 microns and is selected from the group consisting of alumina, silicon carbide, zirconia and sheet-metal.

9. A coating composition comprising, as a weight percent of solids based on the total weight of solids:
    (a) 1-35% by weight of one or more fluoropolymer;
    (b) 1-70% by weight of one or more epoxy resin;
    (c) 5-70% by weight of one or more polyamideimide;
    (d) 1-40% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and a solubly or dispersibly effective amount of solvent.

10. The coating composition of claim 9, wherein the fluoropolymer is selected from the group consisting of polytetrafluoroethylene, tetrafluoroethylene-hexafluoropropylene copolymer, tetrafluoroethylene-perfluoroalkylvinylether copolymer, ethylene-tetrafluoroethylene copolymer, polyvinyl fluoride, polyvinylidene fluoride, polyhexafluoropropylene, ethylene-hexafluoropropylene copolymer, ethylene-vinyl fluoride copolymer, or any combination thereof.

11. The coating composition of claim 9, comprising, as a weight percent of solids based on the total weight of solids:
    3-35% by weight of one or more fluoropolymer;
    2-60% by weight of one or more epoxy resin;
    6-55% by weight of one or more polyamideimide;
    7-40% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
    solubly or dispersibly effective amount of solvent.

12. The coating composition of claim 9, comprising, as a weight percent of solids based on the total weight of solids:
   8-35% by weight of one or more fluoropolymer;
   15-70% by weight of one or more epoxy resin;
   6-17% by weight of one or more polyamideimide;
   5-35% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
   solubly or dispersibly effective amount of a solvent mixture comprising water and non-aqueous solvent.

13. The coating composition of claim 9, comprising, as a weight percent of solids based on the total weight of solids:
   10-35% by weight of one or more fluoropolymer;
   1-15% by weight of one or more epoxy resin;
   17-55% by weight of one or more polyamideimide;
   8-34% by weight of an auxiliary binder consisting of one or more of polyethersulfone, polyphenylene sulfide, polyamide, polyimide, polyether ether ketone, polyetherimide, polyurethane, alkyd resin, polyester, or acrylic polymers; and
   a solubly or dispersibly effective amount of non-aqueous solvent.

14. The coating composition of claim 9, further comprising:
   1-15% by weight of one or more colorant, pigment or dye; and
   0.5-4% by weight of one or more hard fillers.

15. The coating composition of claim 14, wherein the hard filler is a particulate filler having an average particle size of 1-100 microns and is selected from the group consisting of alumina, silicon carbide, zirconia and sheet-metal.

16. An article comprising:
   (a) a substrate and
   (b) the anticorrosion film of claim 1 disposed on said substrate.

\* \* \* \* \*